(12) United States Patent
Gao et al.

(10) Patent No.: US 12,482,144 B2
(45) Date of Patent: Nov. 25, 2025

(54) METHOD AND APPARATUS OF ENCODING/DECODING POINT CLOUD GEOMETRY DATA USING AZIMUTHAL CODING MODE

(71) Applicant: Beijing Xiaomi Mobile Software Co., Ltd., Beijing (CN)

(72) Inventors: Shuo Gao, Beijing (CN); Sebastien Lasserre, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 164 days.

(21) Appl. No.: 18/553,786

(22) PCT Filed: Oct. 13, 2021

(86) PCT No.: PCT/CN2021/123664
§ 371 (c)(1),
(2) Date: Oct. 3, 2023

(87) PCT Pub. No.: WO2022/213571
PCT Pub. Date: Oct. 13, 2022

(65) Prior Publication Data
US 2024/0185475 A1 Jun. 6, 2024

(30) Foreign Application Priority Data
Apr. 8, 2021 (EP) .................................... 21305455

(51) Int. Cl.
*G06T 9/40* (2006.01)
*G06T 9/00* (2006.01)
(52) U.S. Cl.
CPC . *G06T 9/40* (2013.01); *G06T 9/00* (2013.01)
(58) Field of Classification Search
CPC ........... G06T 9/40; G06T 9/00; H04N 19/597; H04N 19/184; H04N 19/70; H04N 19/90
See application file for complete search history.

(56) References Cited

U.S. PATENT DOCUMENTS

2022/0108488 A1* 4/2022 Ramasubramonian ......................
H04N 19/13
2022/0351423 A1* 11/2022 Martin-Cocher ......... G06T 9/40
(Continued)

FOREIGN PATENT DOCUMENTS

WO WO 2021084292 A 5/2021

OTHER PUBLICATIONS

International Search Report and Written Opinion of International Application No. PCT/CN2021/123664, dated Jan. 5, 2022, 11 pages.

*Primary Examiner* — Daniel F Hajnik
*Assistant Examiner* — Brianna Renae Cochran
(74) *Attorney, Agent, or Firm* — Finnegan, Henderson, Farabow, Garrett & Dunner, L.L.P.

(57) ABSTRACT

A method of encoding a point cloud into a bitstream of encoded point cloud data representing a physical object is provided. The method includes an azimuthal coding mode providing a series of bits for encoding a coordinate of a point of the point cloud. The method includes: dividing a parent interval, to which the point coordinate belongs to, into a left half interval and a right half interval; interpolating a left angle ($\varphi_{left,d}$), associated with the left half interval, and a right angle ($\varphi_{right,d}$), associated with the right half interval, from at least one inherited angle associated with the parent interval; selecting a context depending on the left angle ($\varphi_{left,d}$) and the right angle ($\varphi_{right,d}$); and context-adaptive binary entropy encoding a bit ($b_d$), into the bitstream, based on the selected context, the coded bit ($b_d$) indicating which of the two half intervals the point coordinate belongs to.

20 Claims, 9 Drawing Sheets

(56) References Cited

U.S. PATENT DOCUMENTS

2022/0398784 A1* 12/2022 Taquet .................... G06T 9/001
2023/0419552 A1* 12/2023 Oh ........................... G06T 9/40

* cited by examiner

METHOD AND APPARATUS OF ENCODING/DECODING POINT CLOUD GEOMETRY DATA USING AZIMUTHAL CODING MODE

CROSS-REFERENCE TO RELATED APPLICATION

This application is a National Stage of International Application No. PCT/CN2021/123664, filed on Oct. 13, 2021, which claims priority to European Patent Application No. 21305455.4 filed on Apr. 8, 2021, the entire content of both of which is hereby incorporated by reference.

FIELD

The present disclosure generally relates to point cloud compression and, in particular to methods and apparatus of encoding/decoding point cloud geometry data using azimuthal coding mode.

BACKGROUND

The present section is intended to introduce the reader to various aspects of art, which may be related to various aspects of at least one exemplary embodiments of the present disclosure that is described and/or claimed below. This discussion is believed to be helpful in providing the reader with background information to facilitate a better understanding of the various aspects of the present disclosure.

As a format for the representation of 3D data, point clouds have recently gained traction as they are versatile in their capability in representing all types of physical objects or scenes. Point clouds may be used for various purposes such as culture heritage/buildings in which objects like statues or buildings are scanned in 3D in order to share the spatial configuration of the object without sending or visiting it. Also, it is a way to ensure preserving the knowledge of the object in case it may be destroyed; for instance, a temple by an earthquake. Such point clouds are typically static, colored and huge.

Another use case is in topography and cartography in which using 3D representations allows for maps that are not limited to the plane and may include the relief. Google Maps is now a good example of 3D maps but uses meshes instead of point clouds. Nevertheless, point clouds may be a suitable data format for 3D maps and such point clouds are typically static, colored and huge.

Virtual Reality (VR) and immersive worlds have become hot topics recently and are foreseen by many as the future of 2D flat video. The basic idea is to immerse the viewer in an environment that surrounds the viewer, in contrast to a standard TV in which the viewer can only look at the virtual world in front of the viewer. There are several gradations in the immersivity depending on the freedom of the viewer in the environment. A point cloud is a good format candidate for distributing VR worlds.

The automotive industry and the autonomous car are also domains in which point clouds may be used. Autonomous cars should be able to "probe" their environment to make good driving decisions based on the reality of their immediate neighbors.

A point cloud is a set of points located in a tridimensional (3D) space, optionally with additional values attached to each of the points. These additional values are usually called attributes. Attributes may be, for example, three-component colors, material properties like reflectance and/or two-component normal vectors to a surface associated with a point.

A point cloud is thus a combination of a geometry (3D locations of the points in a 3D space represented by 3D cartesian coordinates x,y,z) and attributes.

Point clouds may be captured by various types of devices like an array of cameras, depth sensors, lasers (light detection and ranging), scanners, or may be computer-generated (in movie post-production for example). Depending on the use cases, points clouds may have from thousands to up to billions of points for cartography applications. Raw representations of point clouds require a very high number of bits per point, with at least a dozen of bits per cartesian coordinate x, y or z, and optionally more bits for the attribute(s), for instance three times 10 bits for the colors.

It is important in many applications to be able to distribute dynamic point clouds to an end-user (or store them in a server) by consuming only a reasonable amount of bit-rate (or storage space for storage applications) while maintaining an acceptable (or preferably very good) quality of experience. Efficient compression of these dynamic point clouds is a key point in order to make the distribution chain of many immersive worlds practical.

Compression may be lossy (like in video compression) for the distribution to and visualization by an end-user, for example on AR/VR glasses or any other 3D-capable device. Other use cases do require lossless compression, like medical applications or autonomous driving, to avoid altering the results of a decision obtained from the analysis of the compressed and transmitted point cloud.

SUMMARY

According to a first aspect of the present disclosure, there is provided a method of encoding a point cloud into a bitstream of encoded point cloud data representing a physical object, the method comprising an azimuthal coding mode providing a series of bits for encoding a coordinate of a point of the point cloud. The method comprises:
  dividing a parent interval, to which the point coordinate belongs to, into a left half interval and a right half interval;
  interpolating a left angle, associated with the left half interval, and a right angle, associated with the right half interval, from at least one inherited angle associated with the parent interval;
  selecting a context depending on the left angle and the right angle; and
  context-adaptive binary entropy encoding a bit, into the bitstream, based on the selected context, said coded bit indicating which of the two half intervals the point coordinate belongs to.

According to a second aspect of the present disclosure, there is provided a method of decoding a point cloud from a bitstream of encoded point cloud data representing a physical object, the method comprising an azimuthal coding mode providing a series of bits for decoding a coordinate of a point of the point cloud. The method comprises:
  dividing a parent interval, to which the point coordinate belongs to, into a left half interval and a right half interval;
  interpolating a left angle, associated with the left half interval, and a right angle, associated with the right half interval, from at least one inherited angle associated with the parent interval;
  selecting a context depending on the left angle and the right angle; and context-adaptive binary entropy decoding a bit, from the bitstream, based on the selected context, said decoded bit indicating which of the two half intervals the point coordinate belongs to.

According to a third aspect of the present disclosure, there is provided an apparatus of encoding a point cloud into a bitstream of encoded point cloud data representing a physical object. The apparatus comprising one or more processors configured to carry out a method according to the first aspect of the present disclosure.

According to a fourth aspect of the present disclosure, there is provided an apparatus of decoding a point cloud from a bitstream of encoded point cloud data representing a physical object. The apparatus comprising one or more processors configured to carry out a method according to the second aspect of the present disclosure.

According to a fifth aspect of the present disclosure, there is provided a non-transitory storage medium carrying instructions of program code for executing a method of encoding a point cloud into a bitstream of encoded point cloud data representing a physical object according to the first aspect of the present disclosure.

According to a sixth aspect of the present disclosure, there is provided a non-transitory storage medium carrying instructions of program code for executing a method of decoding a point cloud from a bitstream of encoded point cloud data representing a physical object, the method comprising an azimuthal coding mode providing a series of bits for decoding a coordinate of a point of the point cloud according to the second aspect of the present disclosure.

BRIEF DESCRIPTION OF THE DRAWINGS

Reference will now be made, by way of example, to the accompanying drawings which show embodiments of the present disclosure, and in which.

Similar reference numerals may have been used in different figures to denote similar components.

DETAILED DESCRIPTION

Figure 1:
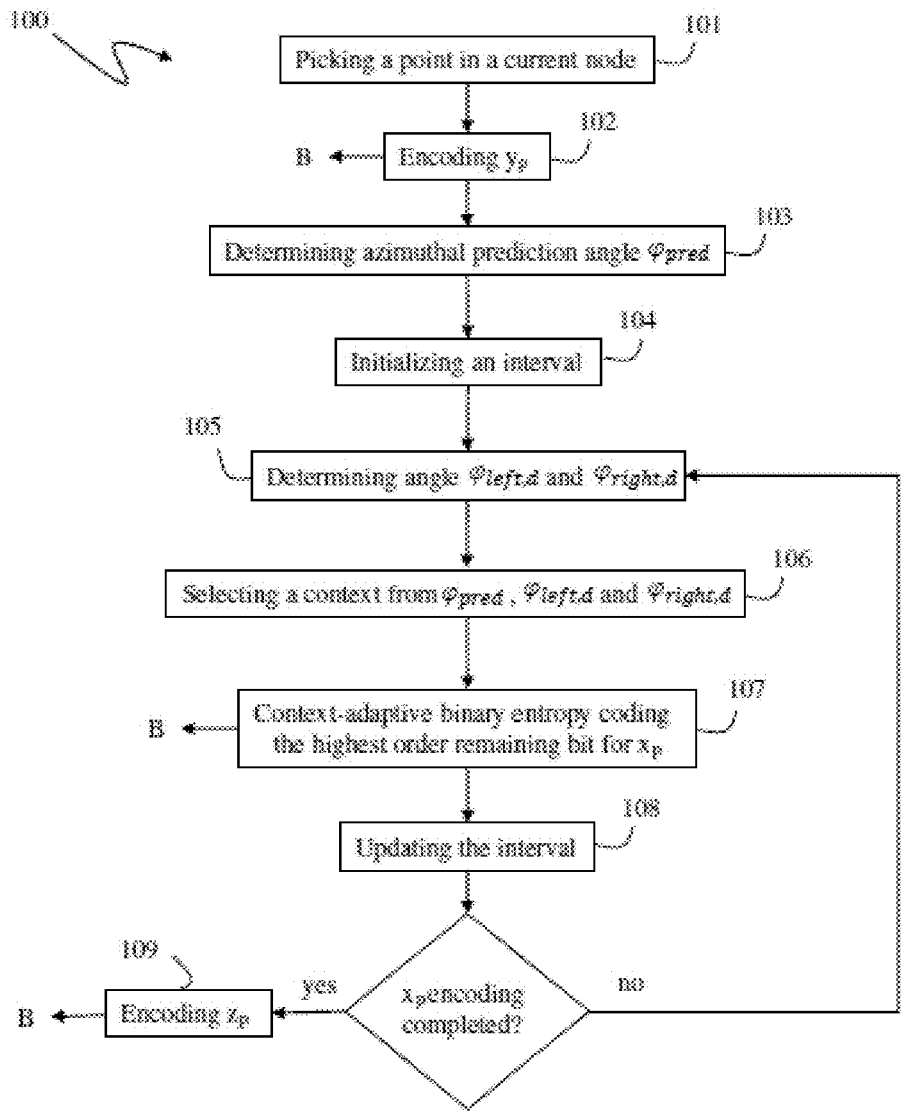
FIG. 1 illustrates a block diagram of steps of a method of encoding a x-coordinate of a point using an azimuthal coding mode in case the azimuthal coding direction is along the x axis in accordance with related art.

At least one of the embodiments is described more fully hereinafter with reference to the accompanying figures, in which examples of at least one of the embodiments are illustrated. An exemplary embodiment may, however, be embodied in many alternate forms and should not be construed as limited to the examples set forth herein. Accordingly, it should be understood that there is no intent to limit embodiments to the particular forms disclosed. On the contrary, the disclosure is intended to cover all modifications, equivalents, and alternatives falling within the spirit and scope of the present disclosure.

When a figure is presented as a flow diagram, it should be understood that it also provides a block diagram of a corresponding apparatus. Similarly, when a figure is presented as a block diagram, it should be understood that it also provides a flow diagram of a corresponding method/process.

As described above, it is important in many applications to be able to distribute dynamic point clouds to an end-user. Efficient compression of these dynamic point clouds is a key point in order to make the distribution chain of many immersive worlds practical.

Until recently, point cloud compression (aka PCC) was not addressed by the mass market and no standardized point cloud codec was available. In 2017, the standardization working group ISO/JCT1/SC29/WG11, also known as Moving Picture Experts Group or MPEG, has initiated work items on point cloud compression. This has led to two standards, namely:

MPEG-I part 5 (ISO/IEC 23090-5) or Video-based Point Cloud Compression (V-PCC)

MPEG-I part 9 (ISO/IEC 23090-9) or Geometry-based Point Cloud Compression (G-PCC)

The V-PCC coding method compresses a point cloud by performing multiple projections of a 3D object to obtain 2D patches that are packed into an image (or a video when dealing with moving point clouds). Obtained images or videos are then compressed using already existing image/video codecs, allowing for the leverage of already deployed image and video solutions. By its very nature, V-PCC is efficient only on dense and continuous point clouds because image/video codecs are unable to compress non-smooth patches as would be obtained from the projection of, for example, Lidar-captured sparse geometry data.

The G-PCC coding method has two schemes for the compression of a captured sparse geometry data.

The first scheme is based on an occupancy tree (octree) representation of the point cloud geometry. Occupied nodes are split down until a certain size is reached, and occupied leaf nodes provide the 3D locations of points. A leaf node is usually represented by a volume, typically a cube having a given size at a known 3D locations. The center of this volume may define the 3D location of one point. Alternatively, Inferred Direct Coding Mode (IDCM) may be used to code directly the 3D location of a point within a leaf node belonging to the occupancy tree. Sparse point clouds can benefit from the Inferred Direct Coding Mode (IDCM) by directly coding the 3D location of one or a few points within a node with non-minimal size, by stopping the tree construction when only isolated points are present in a node.

The second scheme is based on a predictive tree, each node representing the 3D location of one point and the relation between nodes is spatial prediction from parent to children. This method can only address sparse point clouds and offers the advantage of lower latency and simpler decoding than the occupancy tree. However, compression performance is only marginally better, and the encoding is complex, relatively to the first occupancy-based method, intensively looking for the best predictor (among a long list of potential predictors) when constructing the predictive tree.

In the first scheme, an azimuthal coding mode has been introduced to improve IDCM applied to a current leaf node. Basically, the azimuthal coding mode uses azimuthal angles of already coded points (belonging to already coded leaf nodes) to provide a series of bits for encoding a x or y-coordinate of a point of the point cloud. This very significantly improves the compression of the location of the point relative to the current leaf node. Firstly, an azimuthal coding direction (either along an x axis or an y axis of a horizontal plane), for which a coordinate of a point P will be context-adaptive binary entropy encoded, is selected based on the x- and y-coordinate of a point P (within a current node) relative to the x and y axes. For example, the azimuthal coding direction is along the x axis if $|x_{node}| \leq |y_{node}|$ where $x_{node}$ and $y_{node}$ are the x- and y-coordinates representative of the current leaf node location, otherwise it is along the y axis. For example, $x_{node}$ and $y_{node}$ may be the x- and y-coordinates of the center of the current leaf node. Let us denote $(x_P, y_P, z_P)$ the coordinates of the point P. In case the selected azimuthal coding direction is along the x (respectively y) axis, the following coordinate encoding are processed:

First, the $y_P$ (respectively $x_P$) coordinate bits are coded,
Next, the $x_P$ (respectively $y_P$) coordinate bits are context-adaptive binary entropy encoded,
and finally, the $z_P$ coordinate of the point P are entropy encoded.

The first encoding $y_P$ (respectively $x_P$) may be performed using bypass entropy coding, i.e. bits representing $y_P$ (respectively $x_P$) are simply pushed into a bitstream. Alternatively, the first encoding $y_P$ (respectively $x_P$) may be performed using context-adaptive binary entropy coding.

On Figures, angles are depicted univocally as points on a line segment supporting an interval. To an angle corresponds a unique point on the line segment, and to any point corresponds a unique azimuthal angle. In the following, the azimuthal angle associated with a point is defined between, on one hand, the line joining the origin of a 2D (xy) horizontal plane to the point and, on the other hand, the x axis. This corresponds to the classical definition of azimuthal angles $\varphi$ by $\varphi = a\tan 2(y_P, x_P) = a\tan(y_P, x_P)$, The disclosure is not limited to this definition of azimuthal angles and may, for instance, use an alternative axis for origin ($\varphi = 0$) of angles.

FIG. 1 illustrates a block diagram of steps of a method 100 of encoding a x-coordinate of a point using an azimuthal coding mode in case the azimuthal coding direction is along the x axis in accordance with the related art.

The method 100 is detailed when an azimuthal coding direction is along the x axis. An equivalent method may be deduced when the azimuthal coding direction is along the y axis by replacing the x-coordinate and x axis by the y-coordinate and y axis respectively and inversely.

In step 101, a point P having $(x_P, y_P, z_P)$ coordinates is picked in a current (leaf) node, and an azimuthal coding direction (here along the x axis) is selected along which one point coordinate (here $x_P$) will be context-adaptive binary entropy encoded in a bitstream B.

In step 102, the other point coordinate (here $y_P$) along the opposite direction (here the y axis) is bypassed entropy coded in a bitstream B.

In step 103, an azimuthal prediction angle $\varphi_{pred}$ is determined for the point P. This azimuthal prediction angle $\varphi_{pred}$ is obtained from an azimuthal angle $\varphi_{al}$ of a (closest) already coded point and a multiple n of an elementary azimuthal shift $\Delta\varphi$ representative of a sensor rotative sampling. The integer n may be chosen such as to obtain $\varphi_{pred} = \varphi_{al} + n\Delta\varphi$ as the closest possible angle (among all possible choices for n) from the azimuthal angle associated with the center of the current node.

In step 104, a parent interval (here x-interval) along the azimuthal coding direction (here x axis) is initialized.

Figure 2:
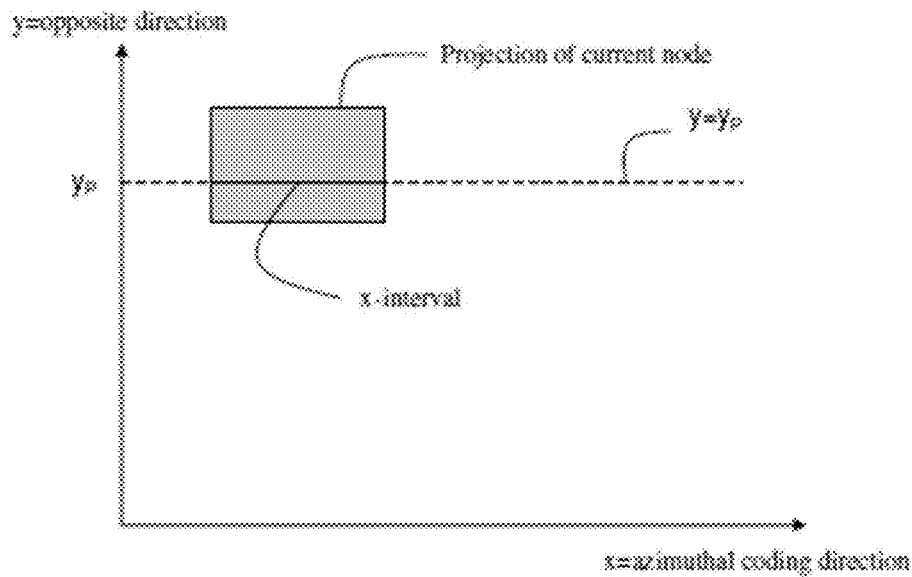
FIG. 2 illustrates the definition of an interval along an azimuthal coding direction in accordance with related art.

Graphically, as depicted on FIG. 2, in a 2D xy plane, this interval belongs to a line parallel to the azimuthal coding direction (here x axis), with opposite coordinate (here $y_P$) that has been already coded. The (here x-) interval is the intersection of this line ($y=y_P$) and a current node projection onto the 2D xy plane.

In step 105, the x-interval is divided into two half intervals: a left half interval and a right half interval. Two angles $\varphi_{left,d}$ and $\varphi_{right,d}$ are determined. The angle $\varphi_{left,d}$ is an angle associated with the left half interval, and the angle $\varphi_{right,d}$ is an angle associated with the right half interval.

In step 106, a context is selected based on prediction angle $\varphi_{pred}$ and the two angles $\varphi_{left,d}$ and $\varphi_{right,d}$.

Figure 3:
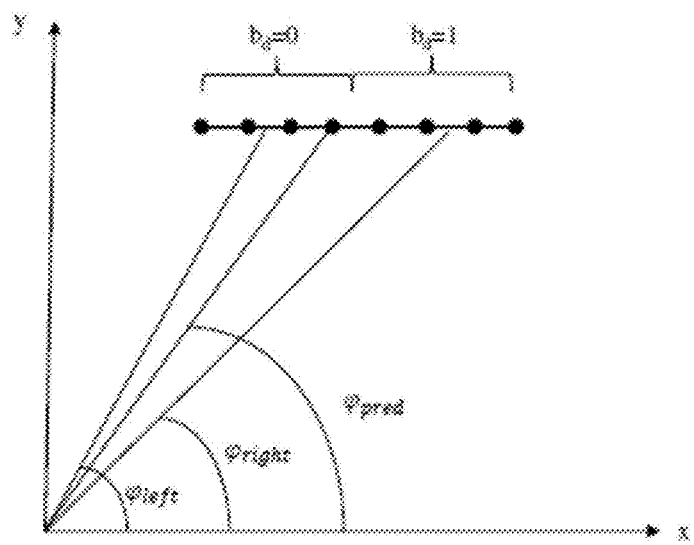
FIG. 3 illustrates updating an interval of the azimuthal coding mode of FIG. 1 when one point coordinate is predicted to belong to the left half interval in accordance with related art.

For example, let's consider FIG. 3 that depicts an exemplary point whose position in an interval along the x-axis (selected azimuthal coding direction) is represented by 3 bits $b_d$ (d=1, 2, 3) representative of the position of the point among 8 possibilities. A first bit ($b_1$) equals to 0 if the coded point is one of the four points on the left and equals 1 if the coded point is one of the four points on the right. The prediction angle $\varphi_{pred}$ provides some predictive information on the point position in the sense that, because the prediction angle $\varphi_{pred}$ points to the left half interval, it is statistically more probable that the coded point belongs to the left half interval (i.e. $b_d=0$) than to the right half interval (i.e. $b_d=1$). One may simply profit from the information carried by the prediction angle $\varphi_{pred}$ by comparing the angle differences $|\varphi_{pred} - \varphi_{left,d}|$ and $|\varphi_{pred} - \varphi_{right,d}|$, and then select a context accordingly. For example if $|\varphi_{pred} - \varphi_{left,d}| < |\varphi_{pred} - \varphi_{right,d}|$, select a first context to entropy code $b_d$,
otherwise select a second context to entropy code $b_d$.

In step 107, the highest ordered remaining bit $b_d$ for $x_P$ is context-adaptive binary entropy encoded, into the bitstream B, by using the selected context. This bit $b_d$ indicates that $x_P$ is located either in the left half interval ($b_d=0$) or the right half interval ($b_d=1$).

In step 108, the x-interval is updated as the half interval to which $x_P$ belongs (as indicated by the coded bit $b_d$). If the coded bit $b_d$ equals 0, it indicates that $x_P$ is in the left half interval and the x-interval is updated as being the left half interval. If the coded bit $b_d$ equals 1, it indicates that $x_P$ is in the right half interval, and the interval is updated as being the right half interval.

Next, the method checks if $x_P$ encoding is completed or not. For example, the method checks if the updated interval size is lower or equals to a minimum x-interval size, or equivalently checks if all the bits $b_d$ are encoded.

If the $x_P$ coding is completed (i.e, for example, if the x-interval size is lower than or equals to the minimum x-interval size), in step 109, the remaining coordinate $z_P$ is coded into the bitstream B.

If the $x_P$ coding is not completed, loop to step 105 to code a next bit $b_{d+1}$ representative of $x_P$.

Figure 4:
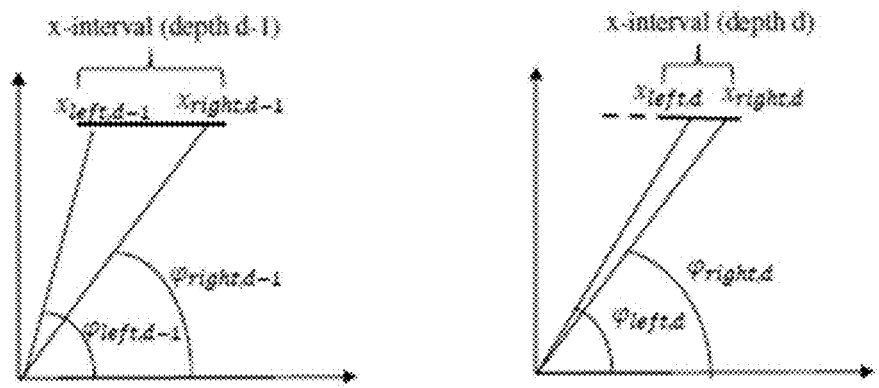
FIG. 4 illustrates updating the x-interval when a bit $b_d$ indicates that $x_P$ is within the right half interval in accordance with related art.

FIG. 4 illustrates updating the x-interval when a bit $b_d$ indicates that $x_P$ is within the right half interval. The right half interval at a current iteration (depth d-1) is then divided at the next iteration (depth d) into two half intervals in step 105.

Figure 5:
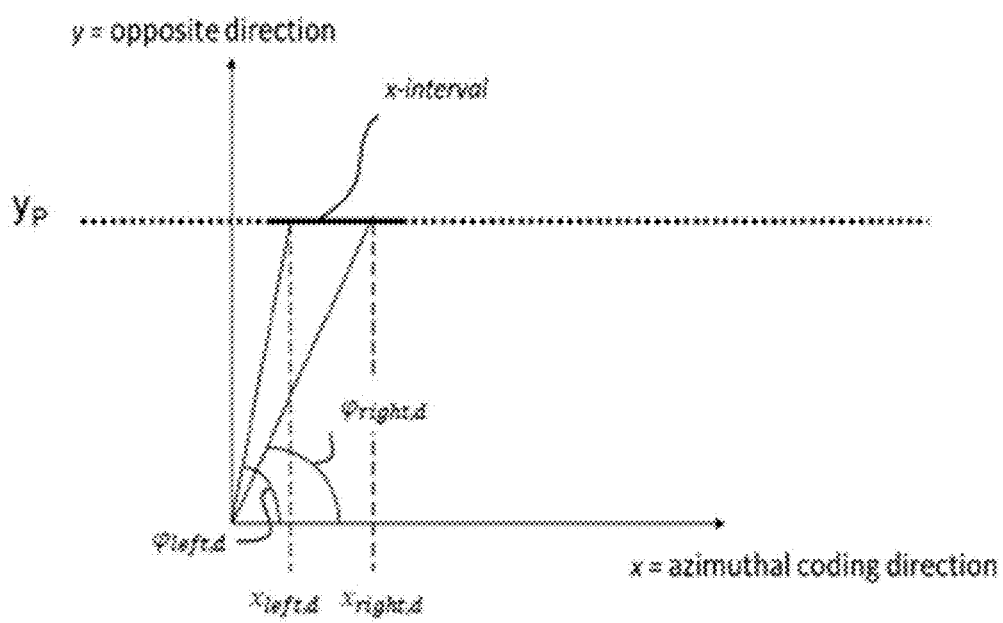
FIG. 5 illustrates an embodiment for determining two angles $\varphi_{left,d}$ and $\varphi_{right,d}$ in accordance with related art.

In the current Test Model of the G-PCC standard, in step 105, the two angles $\varphi_{left,d}$ and $\varphi_{right,d}$ may be determined from positions $x_{left,d}$ and $x_{right,d}$ representative of (but not necessarily equal to) the middle of the two half intervals. A straightforward way to calculate the two angles is to use the arc tangent formulas as illustrated in FIG. 5.

$$\varphi_{left,d} = ia\tan 2(y_P, x_{left,d})$$

$$\varphi_{right,d} = ia\tan 2(y_P, x_{right,d})$$

The computational cost of computing two arc tangent functions may be an issue on some platforms.

Figure 6:
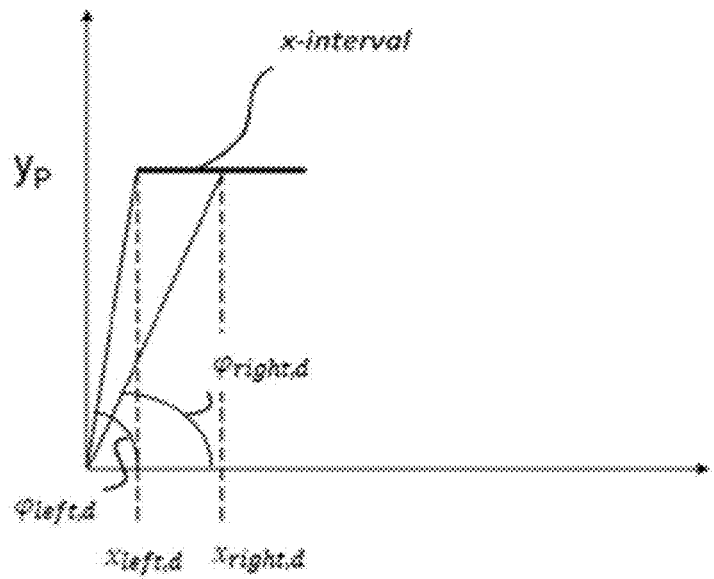
FIG. 6 illustrates an embodiment for calculating two angles $\varphi_{left,d}$ and $\varphi_{right,d}$ in accordance with related art.

To avoid computing two arc tangents for the coding of each bit $b_d$ of a point coordinate along an azimuthal coding direction, the G_PCC Test Model implementation uses specific locations of $x_{left,d}$ and $x_{right,d}$ as depicted on FIG. 6. Namely, $x_{left,d}$ is the leftmost bound of the x-interval and $x_{right,d}$ is the middle of the x-interval. By doing so, the updated (half) interval can inherit from one angle of its parent interval to obtain the updated angle $\varphi_{left,d}$ if $b_{d-1}=0$, angle $\varphi_{left,d}=\varphi_{left,d-1}$ if $b_{d-1}=1$, angle $\varphi_{left,d}=\varphi_{right,d-1}$ By doing so, only one arc tangent function is performed at each iteration (at each depth d) in order to compute $\varphi_{right,d}$.

By taking angles $\varphi_{left,d}$ and $\varphi_{right,d}$ as shown on FIG. 6, the G_PCC Test Model implementation sacrifices compression efficiency, because the two angles are bad representative of the middle of half intervals, to computational simplicity.

To understand why compression efficiency is not optimal, let's refer back to the example of FIG. 6. When using the selected context in a context adaptive binary entropy coder (for example CABAC) to code the bit $b_d$, the coding probabilities will evolve naturally such that $p(b_d=1)<0.5$ for the first context and $p(b_d=1)>0.5$ for the second context. As a general rule, assuming p is the probability of the bit $b_d$ to be 1, the cost for coding 1 is $-\log 2(p)$, and the cost for coding 0 is $-\log 2(1-p)$.

One understands from FIG. 5 that the probabilities associated with the selected context correspond to a reduction of the coding cost because $b_d=0$ or $b_d=1$ is well anticipated by the context selection when the angle $\varphi_{left,d}$ points to the middle of the left half interval and the angle $\varphi_{right,d}$ points to the middle of the right half interval.

Figure 7:
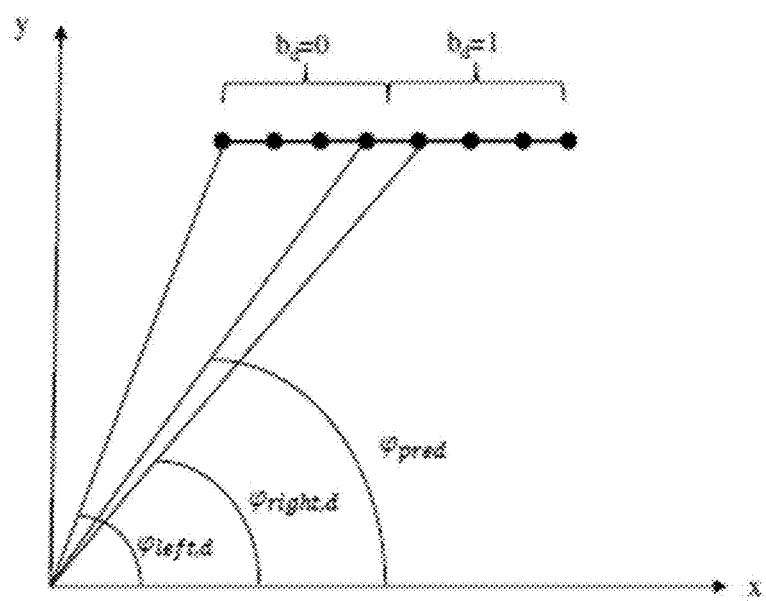
FIG. 7 illustrates drawbacks of the embodiment of FIG. 6 for calculating two angles $\varphi_{left,d}$ and $\varphi_{right,d}$ in accordance with related art.

FIG. 7 shows the same exemplary point but with angles $\varphi_{left,d}$ and $\varphi_{right,d}$ as in the related art depicted on FIG. 6 and implemented in the G-PCC Test Model. On this example, the prediction angle $\varphi_{pred}$ is still pointing to the left half interval, indicating that $b_d=0$ is more likely than $b_d=1$. However, the context selection will select the second context because one has $|\varphi_{pred}-\varphi_{left,d}| \geq |\varphi_{pred}-\varphi_{right,d}|$ with this particular configuration of angles.

This bad context selection impacts the cost of coding the bit $b_d$ because it is likely that $b_d=0$ is coded with the second context which has a probability $p(b_d=0)=1-p(b_d=1)<0.5$ and the coding cost $-\log 2(1-p(b_d=1))$ is high.

Therefore, the angles $\varphi_{left,d}$ and $\varphi_{right,d}$ used for context selection in the current test model (TMC13) are slightly sub-optimal and lead to non-optimal compression efficiency.

Obtaining optimal angles $\varphi_{left,d}$ and $\varphi_{right,d}$ to improve the compression efficiency while maintaining a reasonable complexity is thus highly required. Basically, maintaining a reasonable complexity mostly means minimizing the computing of complex arc tangent functions.

At least one exemplary embodiment of the present disclosure has been devised with the foregoing in mind.

At least one of the aspects generally relates to point cloud encoding and decoding, and at least one other aspect generally relates to transmitting a bitstream generated or encoded.

Moreover, the present aspects are not limited to MPEG standards such as MPEG-I part 5 or part 9 that relate to the Point Cloud Compression, and may be applied, for example, to other standards and recommendations, whether pre-existing or future-developed, and extensions of any such standards and recommendations (including MPEG-I part 5 and part 9). Unless indicated otherwise, or technically precluded, the aspects described in the present disclosure may be used individually or in combination.

The present disclosure relates to a field of encoding and decoding technology, aims to provide a technical solution of encoding/decoding point cloud data. Since the point cloud is a set of mass data, a large amount of memory may be consumed by storing the point cloud, also it is impossible to transmit the point cloud directly in the network layer without compressing the point cloud, so that it is required to compress the point cloud. Therefore, the present disclosure can be used in many application scenarios, as the point cloud is more and more widely used in autonomous navigation, real-time inspection, geographic information service, culture heritage/buildings protection, 3D immersion communication and interaction, and so on.

The present disclosure particularly relates to an azimuthal coding mode that uses angle interpolation to determine the angles $\varphi_{left,d}$ and $\varphi_{right,d}$ on the base of offsets and inherited angles associated with a parent interval used to encode a previous bit. The azimuthal coding mode disclosed in the present disclosure can be used in the method for encoding/decoding the point cloud to improve the compression efficiency while maintaining a reasonable complexity.

The present disclosure avoids performing systematically an arc tangent function for the angle $\varphi_{left,d}$ and an arc tangent function for the angle $\varphi_{right,d}$ at each iteration of the azimuthal coding mode. It improves the compression efficiency compared to the above explained azimuthal coding mode while maintaining a reasonable complexity. It also provides flexibility in the choice of the angles $\varphi_{left,d}$ and $\varphi_{right,d}$.

Figure 8:
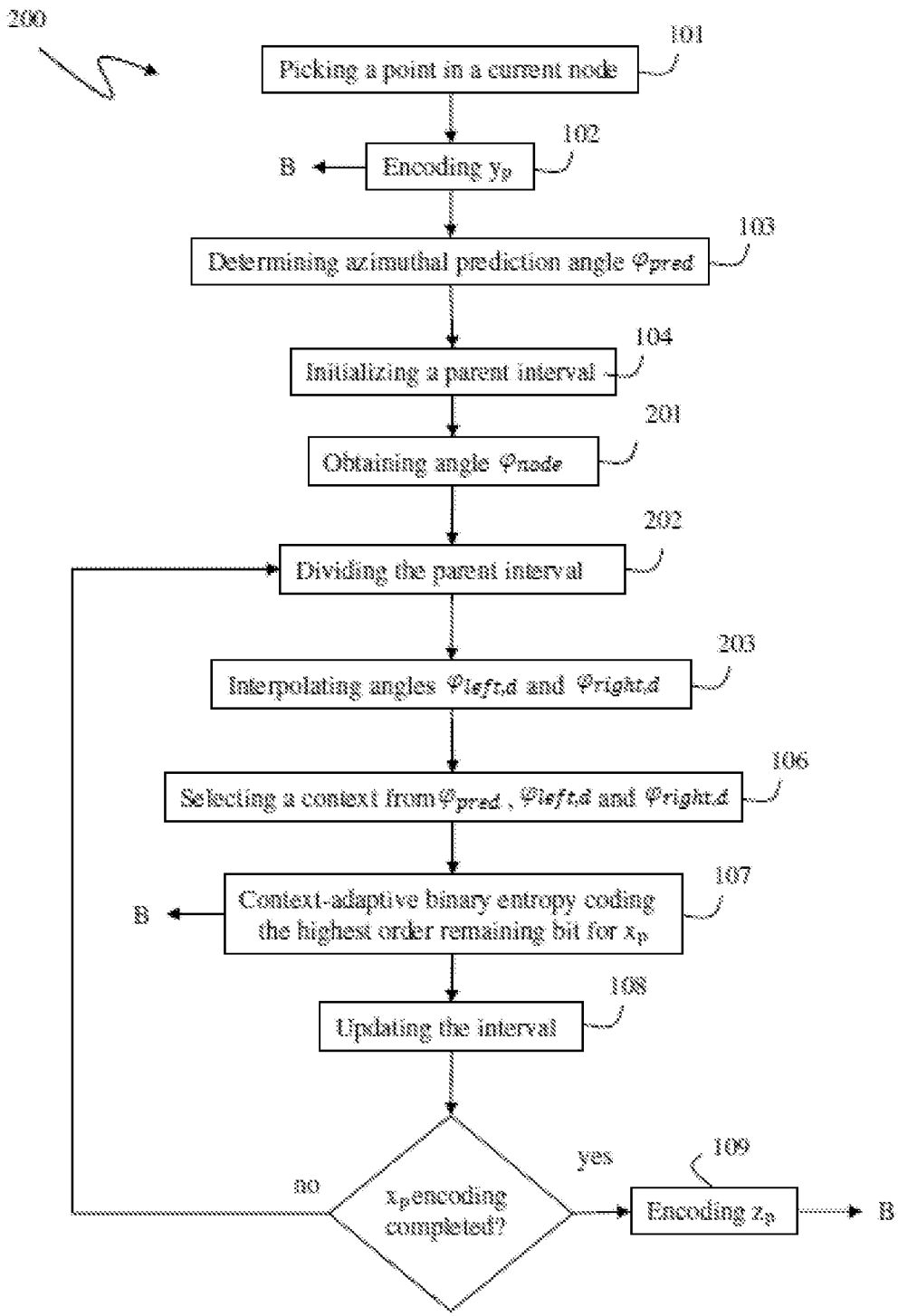
FIG. 8 illustrates a block diagram of steps of a method of encoding a x-coordinate of a point using an azimuthal coding mode in case the azimuthal coding direction is along the x axis in accordance with at least one embodiment.

FIG. 8 illustrates a block diagram of steps of a method 200 of encoding a x-coordinate of a point using an azimuthal coding mode in case the azimuthal coding direction is along the x axis in accordance with at least one exemplary embodiment.

The method 200 is an improvement of the method 100 of FIG. 1. An exemplary point P is picked in a current (leaf)

node of an occupancy tree (step 101). The point position along a selected azimuthal coding direction is represented by bits $b_d$, each bit representing a position of $x_P$ in an x-interval along the x axis. In the following the selected azimuthal coding direction is along the x axis but an equivalent method 200 may be deduced when the azimuthal coding direction along the y axis by replacing the x-coordinate, x axis by y-coordinate and y-axis respectively and inversely. The other point coordinate (here $y_P$) is coded along the opposite direction (here the y axis) (step 102). An azimuthal prediction angle $\varphi_{pred}$ is determined for the point P (step 103). A x-interval along the x axis is initialized (step 104).

In step 201, an angle of the current node $\varphi_{node}$ is obtained. The angle $\varphi_{node}$ may be already known and obtained from a memory or computed by:

$$\varphi_{node} = ia\tan 2(y_P, nodepos\_x) \quad (1)$$

where nodepos_x is a given parameter of IDCM. For example, the parameter nodepos_x may be the lowest x coordinate value associated with the cube associated with the current node. The angle $\varphi_{node}$ is then associated with the lower bound of the parent interval.

In step 202, the parent interval is divided into two half intervals: left half interval and right half interval. The parent interval is either the x-interval initialized in step 104 or a x-interval used for encoding a previous bit $b_{d-1}$.

In step 203, a left angle $\varphi_{left,d}$ associated with the left half interval and a right angle $\varphi_{right,d}$ associated with the right half interval are interpolated from at least one inherited angle associated with the parent interval.

In step 106, a context is selected based on prediction angle $\varphi_{pred}$ and the two angles $\varphi_{left,d}$ and $\varphi_{right,d}$.

In step 107, the highest ordered remaining bit $b_d$ for $x_P$ is context-adaptive binary entropy encoded, into the bitstream B, by using the selected context. This bit indicates that $x_P$ is located either in the left half interval ($b_d=0$) or the right half interval ($b_d=1$).

In accordance with an exemplary embodiment, the context-adaptive binary entropy encoding is a Context-Adaptive Binary Arithmetic Coding (CABAC).

In step 108, the parent interval is updated as the half interval to which $x_P$ belongs (as indicated by the coded bit). If the coded bit $b_d$ equals 0, it indicates that $x_P$ is in the left half interval and the parent interval is updated as being the left half interval. If the coded bit $b_d$ equals 1, it indicates that $x_P$ is in the right half interval, and the parent interval is updated as being the right half interval.

Next, the method checks if $x_P$ encoding is completed or not.

If the $x_P$ coding is completed, in step 109, the remaining coordinate $z_P$ is coded into the bitstream B.

If the $x_P$ coding is not completed, loop to step 202 to code a next bit $b_{d+1}$ representative of $x_P$.

According to an exemplary embodiment of step 203, the left angle $\varphi_{left,d}$ is interpolated by adding a first angle ($\varphi_{1,d}$) with a weighted difference of a second angle ($\varphi_{2,d}$) and a third angle ($\varphi_{3,d}$), and the right angle ($\varphi_{right,d}$) is interpolated by adding a fourth angle ($\varphi_{4,d}$) with a weighted difference of a fifth angle ($\varphi_{5,d}$) and a sixth angle ($\varphi_{6,d}$).

Such an interpolation may be given by $$\begin{cases} \varphi_{left,d} = \varphi_{1,d} + \text{Off}_{left} * (\varphi_{2,d} - \varphi_{3,d})/\text{size}_d \\ \varphi_{right,d} = \varphi_{4,d} + \text{Off}_{right} * (\varphi_{5,d} - \varphi_{6,d})/\text{size}_d \end{cases} \quad (2)$$

where $\text{size}_d$ indicates the size of the interval delimited by the angles $\varphi_{2,d}$ and $\varphi_{3,d}$ ($\varphi_{5,d}$ and $\varphi_{6,d}$), $\text{Off}_{left}$ and $\text{Off}_{right}$ are parameters of the method and at least one of the angles $\varphi_{1,d}, \varphi_{2,d}, \varphi_{3,d}, \varphi_{4,d}, \varphi_{5,d}, \varphi_{6,d}$ is an inherited angle associated with the parent interval used for encoding a previous bit $b_{d-1}$ (previous iteration, at depth d−1). The x-interval used at depth d for encoding a bit $b_d$ is contained into the parent interval.

The angles $\varphi_{left,d}$ and $\varphi_{right,d}$ may not point systematically to the middle of the left and right half intervals. This provides flexibility into the choice of angles $\varphi_{left,d}$ and $\varphi_{right,d}$ by freely settings the values of the parameters $\text{Off}_{left}$, and $\text{Off}_{right}$.

Figure 9:
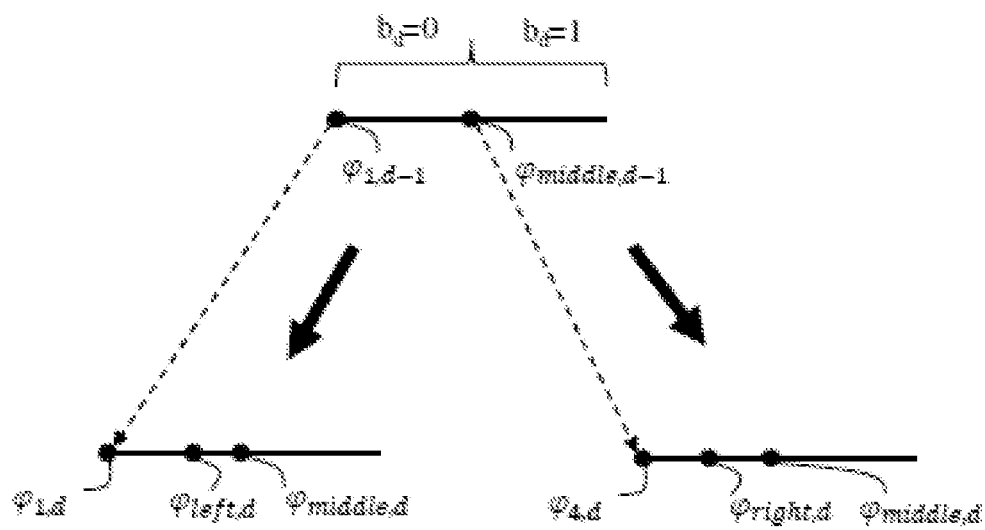
FIG. 9 illustrates an embodiment for interpolating two angles $\varphi_{left,d}$ and $\varphi_{right,d}$ in accordance with at least one embodiment.

According to an exemplary embodiment of step 203, illustrated on FIG. 9, the angles $\varphi_{1,d}, \varphi_{2,d}, \varphi_{3,d}, \varphi_{4,d}, \varphi_{5,d}, \varphi_{6,d}$ in equation (2) are all inherited angles associated with the parent interval: $\varphi_{1,d}=\varphi_{3,d}=\varphi_{6,d}=\varphi_{1,d-1}$, and $\varphi_{2,d}=\varphi_{4,d}=\varphi_{5,d}=\varphi_{middle,d-1}$. The angles $\varphi_{left,d}$ and $\varphi_{right,d}$ are then interpolated by $$\begin{cases} \varphi_{left,d} = \varphi_{1,d-1} + \text{Offset}_{left} * (\varphi_{middle,d-1} - \varphi_{1,d-1})/s'_d \\ \varphi_{right,d} = \varphi_{middle,d-1} + \text{Offset}_{right} * (\varphi_{middle,d-1} - \varphi_{1,d-1})/s'_d \end{cases} \quad (3)$$

where the angles $\varphi_{1,d-1}$ and $b_{middle,d-1}$ are inherited angles associated with the parent interval.

For encoding the first bit $b_{d=1}$ (first iteration), the inherited angle $\varphi_{1,d-1}$ is the angle $\varphi_{node}$ obtained from step 201 and the inherited angle $\varphi_{middle,d-1}$ is associated with the middle point of the initial x-interval (step 104).

For encoding the following bit $b_d$ (following iterations), the inherited angles $\varphi_{1,d-1}$ and $\varphi_{middle,d-1}$ are associated with the parent interval. Dashed line on FIG. 9 illustrates the inheritance link.

For each depth d, an angle $\varphi_{middle,d}$ may be computed by performing an arc tangent function.

For encoding the first bit $b_{d=1}$ (first iteration), the parent angle $\varphi_{middle,0}$ is computed by:

$$\varphi_{middle,0} = ia\tan 2(y_P, x_{lb}+s'_0) \quad (4)$$

where $s'_0=s_0/2$ is half the size of the initial x-interval size $s_0$ (step 104), and $x_{lb}$ is the value of the lower bound of the initial x-interval (step 104).

For encoding the following bits $b_d$ (following iterations), the parent angle $\varphi_{middle,d-1}$ is computed by performing an arc tangent function:

$$\varphi_{middle,d-1} = ia\tan 2(y_P, x_{lb}+s'_{d-1}) \quad (5)$$

where $s'_{d-1}=s_{d-1}/2$ is half the size $s_{d-1}$ of the parent interval, and $x_{lb}$ is the value of the lower bound of the parent interval.

This exemplary embodiment requires performing a single arc tangent function for encoding each bit $b_d$ (equations 4 or 5). It provides thus advantages because it performs the same number of arc tangent function as in related art while preserving high coding performance and flexibility in the choice of the angles $\varphi_{left,d}$ and $\varphi_{right,d}$.

Figure 10:
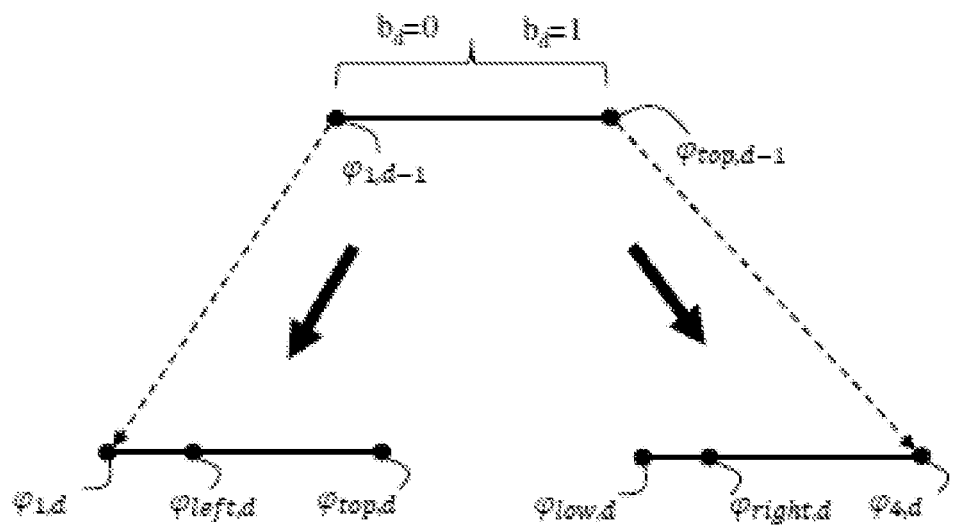
FIG. 10 illustrates an embodiment for interpolating two angles $\varphi_{left,d}$ and $\varphi_{right,d}$ in accordance with at least one embodiment.

According to another exemplary embodiment of step 203, illustrated on FIG. 10, the angles $\varphi_{1,d}, \varphi_{2,d}, \varphi_{3,d}, \varphi_{4,d}, \varphi_{5,d}, \varphi_{6,d}$ in equation (2) are all inherited angles associated with the parent interval: $\varphi_{1,d}=\varphi_{3,d}=\varphi_{5,d}=\varphi_{1,d-1}$, and $\varphi_{2,d}=\varphi_{4,d}=\varphi_{6,d}=\varphi_{top,d-1}$. The angles $\varphi_{left,d}$ and $\varphi_{right,d}$ are interpolated by:

$$\begin{cases} \varphi_{left,d} = \varphi_{1,d-1} + \text{Offset}_{left} * (\varphi_{top,d-1} - \varphi_{1,d-1})/s_d \\ \varphi_{right,d} = \varphi_{top,d-1} + \text{Offset}_{right} * (\varphi_{1,d-1} - \varphi_{top,d-1})/s_d \end{cases} \quad (6)$$

where the angles $\varphi_{1,d-1}$ and $\varphi_{top,d-1}$ are inherited angles associated with the parent interval.

For encoding the first bit $b_{d=1}$ (first iteration), the inherited angle $\varphi_{1,d-1}$ is the angle $\varphi_{node}$ obtained from step 201 and the inherited angle $\varphi_{top,d-1}$ is the angle associated with the upper bound of the initial x-interval.

For encoding the following bit $b_d$ (following iterations), the inherited angles $\varphi_{1,d-1}$ and $\varphi_{top,d-1}$ are associated with the parent interval. Dashed line on FIG. 10 illustrates the inheritance link.

At a given depth d, either an angle $\varphi_{top,d}$ associated with the upper bound of the left half interval or an angle $\varphi_{low,d}$ associated with the lower bound of the right half interval is computed by performing an arc tangent function.

For encoding the first bit $b_{d=1}$ (first iteration), the angle $\varphi_{top,0}$ is computed by:

$$\varphi_{top,0} = ia\tan 2(y_P, x_{lb} + s_0) \quad (7)$$

where $s_0$ is the size of the initial x-interval size (step 104), and $x_{lb}$ is the value of the lower bound of the initial x-interval (step 104).

If $b_{d-1} = 0$ then the left half interval is the parent interval for the next depth d (next iteration) and the angle $\varphi_{top,d}$ is then computed by performing an arc tangent function.

For encoding the following bit $b_d$ (following iteration), the angle $\varphi_{top,d-1}$ is computed by performing an arc tangent function:

$$\varphi_{top,d-1} = ia\tan 2(y_P, x_{lb} + s_{d-1}) \quad (8)$$

where $s_{d-1}$ is the size of the x-interval size at depth d−1, and $x_{lb}$ is the value of the lower bound of the x-interval at depth d−1.

If $b_{d-1} = 1$ then the right half interval is the parent interval for the next depth d and the angle $\varphi_{low,d}$ is then computed by performing an arc tangent function.

For encoding the following bit $b_d$ (following iteration), the angle $\varphi_{low,d-1}$ is computed by:

$$\varphi_{low,d-1} = ia\tan 2(y_P, x_{lb} + s_{d-1}) \quad (10)$$

where $s_{d-1}$ is the size of the x-interval at depth d−1, and $x_{lb}$ is the value of the lower bound of the x-interval at depth d−1.

This exemplary embodiment requires performing a single arc tangent function for encoding each bit $b_d$ (equations 7 to 10). It provides thus advantages because it performs a same number of arc tangent function as in related art while preserving high coding performance and flexibility in the choice of the angles $\varphi_{left,d}$ and $\varphi_{right,d}$.

Figure 11:
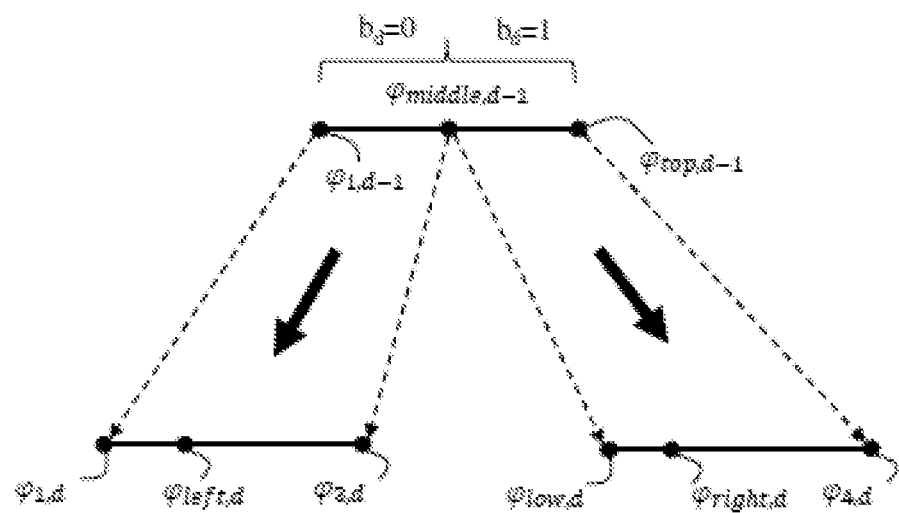
FIG. 11 illustrates a variant of the embodiment of FIG. 10 for interpolating two angles $\varphi_{left,d}$ and $\varphi_{right,d}$ in accordance with at least one embodiment.

In a first variant of the exemplary embodiment of FIG. 10, illustrated in FIG. 11, the angle $\varphi_{top,d}$ or the angle $\varphi_{low,d}$ equals to an inherited angle $\varphi_{middle,d-1}$ associated with the middle point of the parent interval.

This first variant provides lower complexity because it does not require performing any arc tangent function for encoding each bit $b_d$, assuming that $\varphi_{middle,d-1}$ has been determined without calling the arc tangent function. Moreover, it preserves high coding performance and flexibility in the choice of the angles $\varphi_{left,d}$ and $\varphi_{right,d}$.

In a second variant of the exemplary embodiment of FIG. 10, the angle $\varphi_{top,d}$ and the angle $\varphi_{low,d}$ are computed, for encoding the first bit $b_{d=1}$, by equation 7 or 9 and the angles $\varphi_{low,d}$ or the angle $\varphi_{top,d}$ for encoding the following bits $b_d$, equals to the inherited angle $\varphi_{middle,d-1}$ associated with the middle point of the parent interval.

This variant requires only two performing of arc tangent function for encoding a series of bits, lowering thus the complexity of the method and thus the computing resources for implement an azimuthal coding mode while preserving high coding performance (high interpolation precision) and flexibility in the choice of the angles $\varphi_{left,d}$ and $\varphi_{right,d}$.

In a variant of said first or second variant, the inherited angle $\varphi_{middle,d-1}$ is obtained by interpolating two inherited angles $\varphi_{1,d-1}$ and $\varphi_{top,d-1}$ associated with the parent interval:

$$\varphi_{middle,d-1} = (\varphi_{1,d-1} + \varphi_{top,d-1})/2 \quad (11)$$

wherein the angles $\varphi_{1,d-1}$ and $\varphi_{top,d-1}$ are inherited angles associated with the parent interval as above explained in relation with FIGS. 9 and 10 and 11.

This variant does not require recursive call to arc tangent functions to perform encoding of a series of bits, thus lowering the complexity of the method and thus the computing resources for implement an azimuthal coding mode while preserving high coding performance and flexibility in the choice of the angles $\varphi_{left,d}$ and $\varphi_{right,d}$.

In another variant of said first or second variant, the inherited angle $\varphi_{middle,d-1}$ is obtained by performing an arc tangent function (equation 4 or 5) when the size of the parent interval is greater than a determined threshold and is interpolated from two inherited angles $\varphi_{1,d-1}$ and $\varphi_{top,d-1}$ according to equation (11) otherwise when the size of the parent interval is lower than the determined threshold.

This variant provides preserves high precision in nodes having important sizes for which the interpolation of equation (11) would provide too unprecise results and thus damage the compression performance.

Alternatively, the inherited angle $\varphi_{middle,d-1}$ is obtained by performing an arc tangent function (equation 4 or 5) when the absolute value of the difference between the angles $\varphi_{1,d-1}$ and $\varphi_{top,d-1}$ is greater than a determined threshold and is interpolated from two inherited angles $\varphi_{1,d-1}$ and $\varphi_{top,d-1}$ according to equation (11) otherwise.

This variant is advantageous as it preserves interpolation precision, and thus compression performance, while ensuring a lower complexity thanks to the interpolation of $\varphi_{middle,d-1}$ once the interval size has become small enough.

According to an exemplary embodiment of step 203, the parameter $\text{Off}_{left}$ is defined as a difference between a mean position of the center of the left half interval $\text{offset}_{left,mid}$ and an offset Offset2, and the parameter $\text{Off}_{right}$ is defined as the sum of a mean position of the center of the right half interval $\text{offset}_{right,mid}$ and the offset Offset2:

$$\text{Off}_{left} = \text{offset}_{left,mid} - \text{offset2}$$

$$\text{Off}_{right} = \text{offset}_{right,mid} + \text{offset2}$$

The basic idea to obtain good context selection is to obtain angles $\varphi_{left,d}$ and $\varphi_{right,d}$ point close to the center of their respective half intervals. However, it has been observed that optimal compression performance is obtained when angles $\varphi_{left,d}$ and $\varphi_{right,d}$ do not point exactly to the centers of their half interval.

Figure 12:
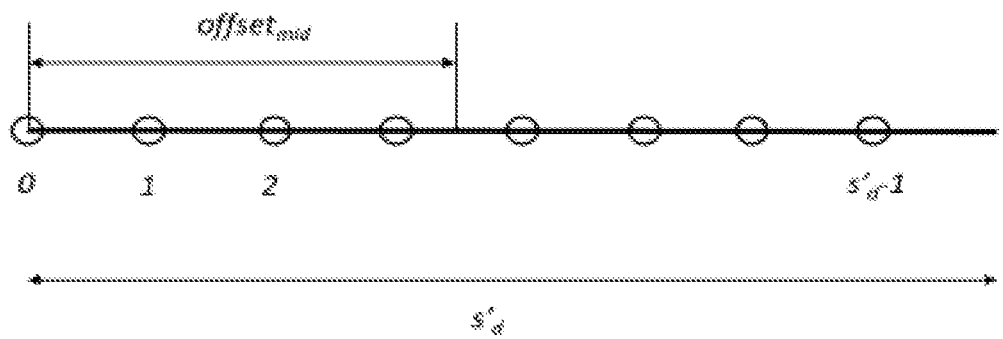
FIG. 12 illustrates an embodiment for calculating the middle of an interval.

For example, the middle of a left half interval is not the straightforward $(\varphi_{middle,d-1} = \varphi_{1,d-1})/2$ because of the discrete position of the points in this left half interval. Instead, middle of the left half interval is defined as the average positions of all potential points belonging to the left half interval, as depicted on FIG. 12.

Considering a half interval of length $s'_d$, potential points are located at position 0, 1, . . . , $s'_d - 1$ from the lower bound of the left half interval. The mean position of the center of the left half interval offset$_{right,mid}$ is then given by:

$$\text{offset}_{right,mid} = (0+1+\ldots+s'_d-2+s'_d-1)/s'_d.$$

Now, using arithmetic progression formula, one gets $$\text{offset}_{right,mid} = (s'_d-1)s'_d/2s'_d = (s'_d-1)/2 = s_d/4 - \tfrac{1}{2}$$

To achieve better compression efficiency, it has been observed that introducing a second offset offset2 as a refinement of the mean position of the center of the left half interval offset$_{left,mid}$ leads to a more efficient selection of the contexts and small extra compression gains are obtained. The basic effect of the second offset Offset2 is to push slightly the left angle $\varphi_{left,d}$ toward the lower bound of the left half interval and the right angle $\varphi_{right,d}$ toward the upper bound of the right half interval.

Same reasoning for the parameter Off$_{right}$ associated with the right half interval.

An exemplary value for offset2 is offset2=2. Also, offset2 may depend on the depth d such that offset2 may equal to 2 for the last depth (i.e. for coding the last bit $b_d$), may equal 1 for the penultimate depth and may equal to 0 for other depths.

Several division operations are performed in the methods 200 and 300. For example, offset$_{left,\,mid}=S_d/4-\tfrac{1}{2}$
the interpolation itself as a division by $s'_d$ or $s_d$ $$s_{d+1}=s_d/2$$

These division operations may be problematic for practical implementation, but they can practically be replaced by shifting >> operations, in particular in the framework of the current G_PCC TMC13 software. This replacement is doable because the size of nodes are powers of two, such that the lengths of intervals are also powers of two.

$$s_{d+1}=s_d>>1$$

Equation (2) becomes:

$$\begin{cases} \varphi_{left,d} = \varphi_{1,d} + (2\text{Off}_{left} * (\varphi_{2,d} - \varphi_{2,d})) \gg L_d \\ \varphi_{right,d} = \varphi_{4,d} + (2\text{Off}_{left} * (\varphi_{5,d} - \varphi_{6,d})) \gg L_d \end{cases}$$

where $L_d$ is the log 2 of the length $s_d$ of the interval such that the $L_d$'s are recursively obtained by $$L_{d+1}=L_d-1$$

The value 2Off$_{left}$ is computed by $$2\text{Off}_{left} = 2\text{offset}_{left,mid} - 2\text{offset2} = \frac{s_d}{2} - 1 - 2\text{offset2} = (s_d \gg 1) - 1 - 2\text{offset2}.$$

Figure 13:
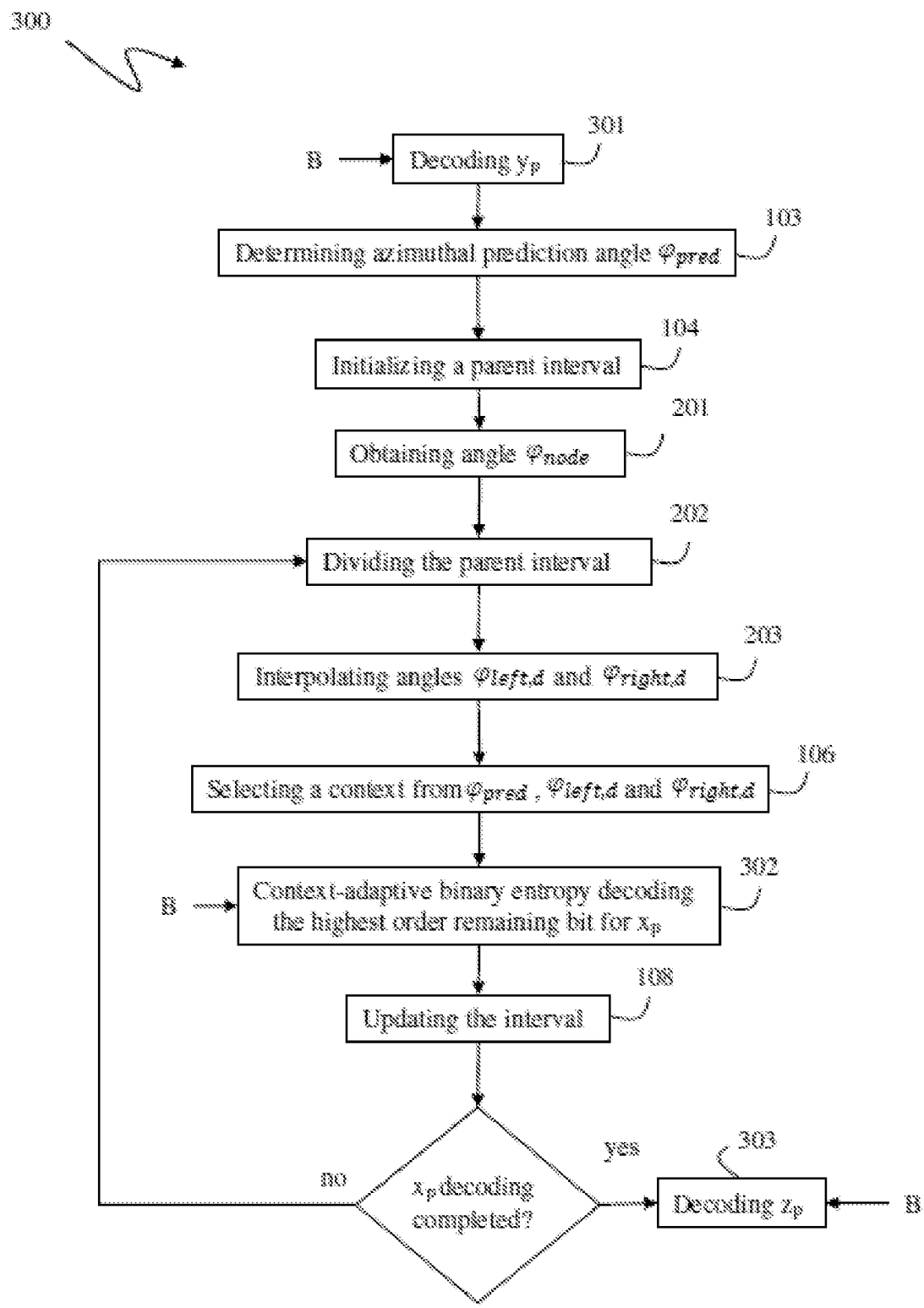
FIG. 13 illustrates a block diagram of steps of a method 300 of decoding a x-coordinate of a point using an azimuthal coding mode in case the azimuthal coding direction is along the x axis in accordance with at least one embodiment.

FIG. 13 illustrates a block diagram of steps of a method 300 of decoding a x-coordinate of a point using an azimuthal coding mode in case the azimuthal coding direction is along the x axis in accordance with at least one exemplary embodiment.

In the following the selected azimuthal coding direction is along the x axis but an equivalent method 300 may be deduced when the azimuthal coding direction along the y axis by replacing the x-coordinate, x axis by y-coordinate and y-axis respectively and inversely.

The azimuthal coding direction is determined from the x- and y-coordinates ($x_{node}$, $y_{node}$) representative of the current (leaf) node to which IDCM is applied IDCM. Alternatively, the azimuthal coding direction may be decoded from the bitstream B.

In step 301, a point coordinate (here $y_P$) is decoded along the opposite direction (here the y axis) from the bitstream B.

In step 103, an azimuthal prediction angle $\varphi_{pred}$ is determined for the point P. An x-interval along the x axis is initialized (step 104). The azimuthal angle $\varphi_{al}$ of a (closest) already decoded point is used and a multiple n of an elementary azimuthal shift is determined by the decoder. Alternatively, the multiple n is decoded from the bitstream B.

In step 104, a parent interval (here x-interval) along azimuthal coding direction (here x axis) is initialized.

In step 201, an angle of the current node $\varphi_{node}$ is obtained by equation (1). The coordinate $y_P$ has been decoded from the bitstream and nodepos_x is a known parameter of the IDCM.

In step 202, the parent interval is divided into two half intervals: a left half interval and a right half interval. The parent interval is either the x-interval initialized in step 104 or an x-interval used for decoding a previous bit $b_{d-1}$.

In step 203, a left angle $\varphi_{left,d}$ associated with the left half interval and a right angle $\varphi_{right,d}$ associated with the right half interval are interpolated from at least one inherited angle associated with the parent interval.

In step 106, a context is selected based on prediction angle $\varphi_{pred}$ and the two angles $\varphi_{left,d}$ and $\varphi_{right,d}$.

In step 302, the highest ordered remaining bit $b_d$ for $x_P$ is context-adaptive binary entropy decoded, from the bitstream B, by using the selected context. This bit indicates that $x_P$ is located either in the left half interval ($b_d$=0) or in the right half interval ($b_d$=1).

In accordance with an exemplary embodiment, the context-adaptive binary entropy decoding is a Context-Adaptive Binary Arithmetic Coding (CABAC).

In step 108, the parent interval is updated as the half interval to which $x_P$ belongs (as indicated by the decoded bit).

Next, the method checks if the decoding of the coordinate $x_P$ is completed or not.

If the $x_P$ decoding is completed, in step 303, the remaining coordinate $z_P$ is decoded from the bitstream B.

If the $x_P$ decoding is not completed, loop to step 202 to decode a next bit $b_{d+1}$ of $x_P$.

The exemplary embodiments and variants of the method 200 apply to the method 300.

The present encoding/decoding method can be used to encode/decode the point cloud which may be used for various purposes, especially used to encode/decode a coordinate of a point of the point cloud, which mproves the compression efficiency while maintaining a reasonable complexity.

Figure 14:
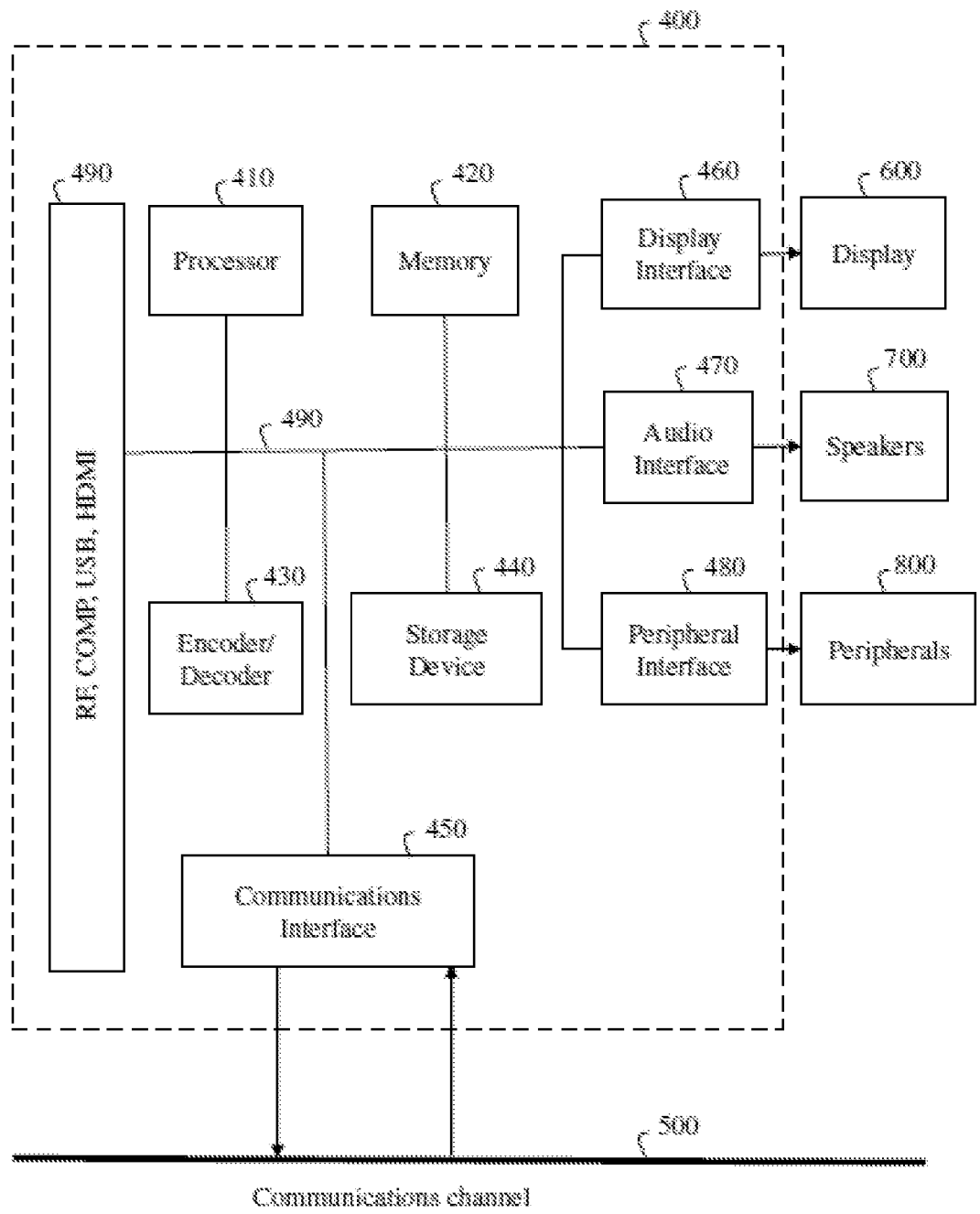
FIG. 14 illustrates a schematic block diagram of an example of a system in which various aspects and embodiments are implemented.

FIG. 14 shows a schematic block diagram illustrating an example of a system in which various aspects and exemplary embodiments are implemented.

System 400 may be embodied as one or more devices including the various components described below. In various embodiments, the system 400 may be configured to implement one or more of the aspects described in the present disclosure.

Examples of equipment that may form all or part of the system 400 include personal computers, laptops, smartphones, tablet computers, digital multimedia set top boxes, digital television receivers, personal video recording systems, connected home appliances, connected vehicles and their associated processing systems, head mounted display devices (HMD, see-through glasses), projectors (beamers), "caves" (system including multiple displays), servers, video encoders, video decoders, post-processors processing output from a video decoder, pre-processors providing input to a video encoder, web servers, set-top boxes, and any other device for processing a point cloud, a video or an image or other communication devices. Elements of system 400, singly or in combination, may be embodied in a single integrated circuit (IC), multiple ICs, and/or discrete components. For example, in at least one embodiment, the processing and encoder/decoder elements of system 400 may be distributed across multiple ICs and/or discrete components. In various embodiments, the system 400 may be communicatively coupled to other similar systems, or to other electronic devices, via, for example, a communications bus or through dedicated input and/or output ports.

The system 400 may include at least one processor 410 configured to execute instructions loaded therein for implementing, for example, the various aspects described in the present disclosure. Processor 410 may include embedded memory, input output interface, and various other circuitries as known in the art. The system 400 may include at least one memory 420 (for example a volatile memory device and/or a non-volatile memory device). System 400 may include a storage device 440, which may include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 440 may include an internal storage device, an attached storage device, and/or a network accessible storage device, as non-limiting examples.

The system 400 may include an encoder/decoder module 430 configured, for example, to process data to provide encoded/decoded point cloud geometry data, and the encoder/decoder module 430 may include its own processor and memory. The encoder/decoder module 430 may represent module(s) that may be included in a device to perform the encoding and/or decoding functions. As is known, a device may include one or both of the encoding and decoding modules. Additionally, encoder/decoder module 430 may be implemented as a separate element of system 400 or may be incorporated within processor 410 as a combination of hardware and software as known to those skilled in the art.

Program code to be loaded onto processor 410 or encoder/decoder 430 to perform the various aspects described in the present disclosure may be stored in storage device 440 and subsequently loaded onto memory 420 for execution by processor 410. In accordance with various embodiments, one or more of processor 410, memory 420, storage device 440, and encoder/decoder module 430 may store one or more of various items during the performance of the processes described in the present disclosure. Such stored items may include, but are not limited to, a point cloud frame, encoded/decoded geometry/attributes videos/images or portions of the encoded/decoded geometry/attribute video/images, a bitstream, matrices, variables, and intermediate or final results from the processing of equations, formulas, operations, and operational logic.

In several embodiments, memory inside of the processor 410 and/or the encoder/decoder module 430 may be used to store instructions and to provide working memory for processing that may be performed during encoding or decoding.

In other embodiments, however, a memory external to the processing device (for example, the processing device may be either the processor 410 or the encoder/decoder module 430) may be used for one or more of these functions. The external memory may be the memory 420 and/or the storage device 440, for example, a dynamic volatile memory and/or a non-volatile flash memory. In several embodiments, an external non-volatile flash memory may be used to store the operating system of a television. In at least one embodiment, a fast external dynamic volatile memory such as a RAM may be used as working memory for video coding and decoding operations, such as for MPEG-2 part 2 (also known as ITU-T Recommendation H.262 and ISO/IEC 13818-2, also known as MPEG-2 Video), HEVC (High Efficiency Video coding), VVC (Versatile Video Coding), or MPEG-I part 5 or part 9.

The input to the elements of system 400 may be provided through various input devices as indicated in block 490. Such input devices include, but are not limited to, (i) an RF portion that may receive an RF signal transmitted, for example, over the air by a broadcaster, (ii) a Composite input terminal, (iii) a USB input terminal, and/or (iv) an HDMI input terminal.

In various embodiments, the input devices of block 490 may have associated respective input processing elements as known in the art. For example, the RF portion may be associated with elements necessary for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which may be referred to as a channel in certain embodiments, (iv) demodulating the down-converted and band-limited signal, (v) performing error correction, and (vi) demultiplexing to select the desired stream of data packets. The RF portion of various embodiments may include one or more elements to perform these functions, for example, frequency selectors, signal selectors, band-limiters, channel selectors, filters, downconverters, demodulators, error correctors, and de-multiplexers. The RF portion may include a tuner that performs various of these functions, including, for example, down-converting the received signal to a lower frequency (for example, an intermediate frequency or a near-baseband frequency) or to baseband.

In one set-top box embodiment, the RF portion and its associated input processing element may receive an RF signal transmitted over a wired (for example, cable) medium. Then, the RF portion may perform frequency selection by filtering, down-converting, and filtering again to a desired frequency band.

Various embodiments rearrange the order of the above-described (and other) elements, remove some of these elements, and/or add other elements performing similar or different functions.

Adding elements may include inserting elements in between existing elements, such as, for example, inserting amplifiers and an analog-to-digital converter. In various embodiments, the RF portion may include an antenna.

Additionally, the USB and/or HDMI terminals may include respective interface processors for connecting system 400 to other electronic devices across USB and/or HDMI connections. It is to be understood that various aspects of input processing, for example, Reed-Solomon error correction, may be implemented, for example, within a separate input processing IC or within processor 410 as necessary. Similarly, aspects of USB or HDMI interface processing may be implemented within separate interface ICs or within processor 410 as necessary. The demodulated, error corrected, and demultiplexed stream may be provided to various processing elements, including, for example, processor 410, and encoder/decoder 430 operating in combination with the memory and storage elements to process the data stream as necessary for presentation on an output device.

Various elements of system 400 may be provided within an integrated housing. Within the integrated housing, the various elements may be interconnected and transmit data therebetween using suitable connection arrangement 490, for example, an internal bus as known in the art, including the I2C bus, wiring, and printed circuit boards.

The system 400 may include communication interface 450 that enables communication with other devices via communication channel 500. The communication interface 450 may include, but is not limited to, a transceiver configured to transmit and to receive data over communication channel 500. The communication interface 450 may include, but is not limited to, a modem or network card and the communication channel 500 may be implemented, for example, within a wired and/or a wireless medium.

Data may be streamed to the system 400, in various embodiments, using a Wi-Fi network such as IEEE 802.11. The Wi-Fi signal of these embodiments may be received over the communications channel 500 and the communications interface 450 which are adapted for Wi-Fi communications. The communications channel 500 of these embodiments may be typically connected to an access point or router that provides access to outside networks including the Internet for allowing streaming applications and other over-the-top communications.

Other embodiments may provide streamed data to the system 400 using a set-top box that delivers the data over the HDMI connection of the input block 490.

Still other embodiments may provide streamed data to the system 400 using the RF connection of the input block 490.

The streamed data may be used as a way for signaling information used by the system 400. The signaling information may comprise the bitstream B and/or information such a number of points of a point cloud, coded bit ($b_d$) indicating which of two half intervals the point coordinate belongs to, an azimuthal coding direction, point coordinates, multiple n of an elementary azimuthal shift azimuthal, an elementary azimuthal shift azimuthal, a parameter node-pos_x.

It is to be appreciated that signaling may be accomplished in a variety of ways. For example, one or more syntax elements, flags, and so forth may be used to signal information to a corresponding decoder in various embodiments.

The system 400 may provide an output signal to various output devices, including a display 600, speakers 700, and other peripheral devices 800. The other peripheral devices 800 may include, in various examples of embodiments, one or more of a stand-alone DVR, a disk player, a stereo system, a lighting system, and other devices that provide a function based on the output of the system 400.

In various embodiments, control signals may be communicated between the system 400 and the display 600, speakers 700, or other peripheral devices 800 using signaling such as AV.Link (Audio/Video Link), CEC (Consumer Electronics Control), or other communications protocols that enable device-to-device control with or without user intervention.

The output devices may be communicatively coupled to system 400 via dedicated connections through respective interfaces 460, 470, and 480.

Alternatively, the output devices may be connected to system 400 using the communications channel 500 via the communications interface 450. The display 600 and speakers 700 may be integrated in a single unit with the other components of system 400 in an electronic device such as, for example, a television.

In various embodiments, the display interface 460 may include a display driver, such as, for example, a timing controller (T Con) chip.

The display 600 and speaker 700 may alternatively be separate from one or more of the other components, for example, if the RF portion of input 490 is part of a separate set-top box. In various embodiments in which the display 600 and speakers 700 may be external components, the output signal may be provided via dedicated output connections, including, for example, HDMI ports, USB ports, or COMP outputs.

In FIGS. 1-14, various methods are described herein, and each of the methods includes one or more steps or actions for achieving the described method. Unless a specific order of steps or actions is required for proper operation of the method, the order and/or use of specific steps and/or actions may be modified or combined.

Some examples are described with regard to block diagrams and/or operational flowcharts. Each block represents a circuit element, module, or portion of code which includes one or more executable instructions for implementing the specified logical function(s). It should also be noted that in other implementations, the function(s) noted in the blocks may occur out of the indicated order. For example, two blocks shown in succession may, in fact, be executed substantially concurrently or the blocks may sometimes be executed in the reverse order, depending on the functionality involved.

The implementations and aspects described herein may be implemented in, for example, a method or a process, an apparatus, a computer program, a data stream, a bitstream, or a signal. Even if only discussed in the context of a single form of implementation (for example, discussed only as a method), the implementation of features discussed may also be implemented in other forms (for example, an apparatus or computer program).

The methods may be implemented in, for example, a processor, which refers to processing devices in general, including, for example, a computer, a microprocessor, an integrated circuit, or a programmable logic device. Processors also include communication devices.

Additionally, the methods may be implemented by instructions being performed by a processor, and such instructions (and/or data values produced by an implementation) may be stored on a computer readable storage medium. A computer readable storage medium may take the form of a computer readable program product embodied in one or more computer readable medium(s) and having computer readable program code embodied thereon that is executable by a computer. A computer readable storage medium as used herein may be considered a non-transitory storage medium given the inherent capability to store the information therein as well as the inherent capability to provide retrieval of the information therefrom. A computer readable storage medium may be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present embodiments may be applied, is merely an illustrative and not an exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

An apparatus may be implemented in, for example, appropriate hardware, software, and firmware. Examples of such apparatus include personal computers, laptops, smartphones, tablet computers, digital multimedia set top boxes, digital television receivers, personal video recording systems, connected home appliances, head mounted display devices (HMD, see-through glasses), projectors (beamers), "caves" (system including multiple displays), servers, video encoders, video decoders, post-processors processing output from a video decoder, pre-processors providing input to a video encoder, web servers, set-top boxes, and any other device for processing a point cloud, a video or an image or other communication devices. As should be clear, the equipment may be mobile and even installed in a mobile vehicle.

Computer software may be implemented by the processor 410 or by hardware, or by a combination of hardware and software. As a non-limiting example, the embodiments may be also implemented by one or more integrated circuits. The memory 420 may be of any type appropriate to the technical environment and may be implemented using any appropriate data storage technology, such as optical memory devices, magnetic memory devices, semiconductor-based memory devices, fixed memory, and removable memory, as non-limiting examples. The processor 410 may be of any type appropriate to the technical environment, and may encompass one or more of microprocessors, general purpose computers, special purpose computers, and processors based on a multi-core architecture, as non-limiting examples.

As will be evident to one of ordinary skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The terminology used herein is for the purpose of describing particular embodiments only and is not intended to be limiting. As used herein, the singular forms "a", "an", and "the" may be intended to include the plural forms as well, unless the context clearly indicates otherwise. It will be further understood that the terms "includes/comprises" and/or "including/comprising" when used in this specification, may specify the presence of stated, for example, features, integers, steps, operations, elements, and/or components but do not preclude the presence or addition of one or more other features, integers, steps, operations, elements, components, and/or groups thereof. Moreover, when an element is referred to as being "responsive" or "connected" to another element, it may be directly responsive or connected to the other element, or intervening elements may be present. In contrast, when an element is referred to as being "directly responsive" or "directly connected" to other element, there are no intervening elements present.

It is to be appreciated that the use of any of the symbol/term "/", "and/or", and "at least one of", for example, in the cases of "A/B", "A and/or B" and "at least one of A and B", may be intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Various numeric values may be used in the present disclosure. The specific values may be for example purposes and the aspects described are not limited to these specific values.

It will be understood that, although the terms first, second, etc. may be used herein to describe various elements, these elements are not limited by these terms. These terms are only used to distinguish one element from another. For example, a first element could be termed a second element, and, similarly, a second element could be termed a first element without departing from the teachings of this application. No ordering is implied between a first element and a second element.

Reference to "one exemplary embodiment" or "an exemplary embodiment" or "one implementation" or "an implementation", as well as other variations thereof, is frequently used to convey that a particular feature, structure, characteristic, and so forth (described in connection with the embodiment/implementation) is included in at least one embodiment/implementation. Thus, the appearances of the phrase "in one exemplary embodiment" or "in an exemplary embodiment" or "in one implementation" or "in an implementation", as well any other variations, appearing in various places throughout this application are not necessarily all referring to the same embodiment.

Similarly, reference herein to "in accordance with an exemplary embodiment/example/implementation" or "in an exemplary embodiment/example/implementation", as well as other variations thereof, is frequently used to convey that a particular feature, structure, or characteristic (described in connection with the exemplary embodiment/example/implementation) may be included in at least one exemplary embodiment/example/implementation. Thus, the appearances of the expression "in accordance with an exemplary embodiment/example/implementation" or "in an exemplary embodiment/example/implementation" in various places in the specification are not necessarily all referring to the same exemplary embodiment/example/implementation, nor are separate or alternative exemplary embodiment/examples/implementation necessarily mutually exclusive of other exemplary embodiments/examples/implementation.

Reference numerals appearing in the claims are by way of illustration only and shall have no limiting effect on the scope of the claims. Although not explicitly described, the present embodiments/examples and variants may be employed in any combination or sub-combination.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Although some of the diagrams include arrows on communication paths to show a primary direction of communication, it is to be understood that communication may occur in the opposite direction to the depicted arrows.

Various implementations involve decoding. "Decoding", as used in this application, may encompass all or part of the processes performed, for example, on a received point cloud frame (including possibly a received bitstream which encodes one or more point cloud frames) in order to produce a final output suitable for display or for further processing in the reconstructed point cloud domain. In various embodiments, such processes include one or more of the processes typically performed by a decoder. In various embodiments, such processes also, or alternatively, include processes performed by a decoder of various implementations described in this application, for example, As further examples, in one embodiment "decoding" may refer only to de-quantizing, in one embodiment "decoding" may refer to entropy decoding, in another embodiment "decoding" may refer only to differential decoding, and in another embodiment "decoding" may refer to combinations of de-quantizing, entropy decoding and differential decoding. Whether the phrase "decoding process" may be intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application may encompass all or part of the processes performed, for example, on an input point cloud frame in order to produce an encoded bitstream. In various embodiments, such processes include one or more of the processes typically performed by an encoder. In various embodiments, such processes also, or alternatively, include processes performed by an encoder of various implementations described in this application.

As further examples, in one embodiment "encoding" may refer only to quatizing, in one embodiment "encoding" may refer only to entropy encoding, in another embodiment "encoding" may refer only to differential encoding, and in another embodiment "encoding" may refer to combinations of quantizing, differential encoding and entropy encoding. Whether the phrase "encoding process" may be intended to refer specifically to a subset of operations or generally to the broader encoding process will be clear based on the context of the specific descriptions and is believed to be well understood by those skilled in the art.

Additionally, this application may refer to "determining" various pieces of information. Determining the information may include one or more of, for example, estimating the information, calculating the information, predicting the information, or retrieving the information from memory.

Further, this application may refer to "accessing" various pieces of information. Accessing the information may include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

Also, as used herein, the word "signal" refers to, among other things, indicating something to a corresponding decoder. For example, in certain embodiments the encoder signals a particular information such a number of points of a point cloud, coded bit ($b_d$) indicating which of two half intervals the point coordinate belongs to, an azimuthal coding direction, point coordinates, multiple n of an elementary azimuthal shift azimuthal, an elementary azimuthal shift azimuthal, a parameter nodepos_x. In this way, in an embodiment the same parameter may be used at both the encoder side and the decoder side. Thus, for example, an encoder may transmit (explicit signaling) a particular parameter to the decoder so that the decoder may use the same particular parameter. Conversely, if the decoder already has the particular parameter as well as others, then signaling may be used without transmitting (implicit signaling) to simply allow the decoder to know and select the particular parameter. By avoiding transmission of any actual functions, a bit savings is realized in various embodiments. It is to be appreciated that signaling may be accomplished in a variety of ways. For example, one or more syntax elements, flags, and so forth are used to signal information to a corresponding decoder in various embodiments. While the preceding relates to the verb form of the word "signal", the word "signal" may also be used herein as a noun.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method of encoding a point cloud into a bitstream of encoded point cloud data representing a physical object, the method comprising an azimuthal coding mode providing a series of bits for encoding a coordinate of a point of the point cloud, wherein the method comprises:

dividing a parent interval, to which the point coordinate belongs to, into a left half interval and a right half interval;

interpolating a left angle ($\varphi_{left,d}$), associated with the left half interval, and a right angle ($\varphi_{right,d}$), associated with the right half interval, from at least one inherited angle associated with the parent interval;

selecting a context depending on the left angle ($\varphi_{left,d}$) and the right angle ($\varphi_{right,d}$); and context-adaptive binary entropy encoding a bit ($b_d$), into the bitstream, based on the selected context, the encoded bit ($b_d$) indicating which of the two half intervals the point coordinate belongs to.

2. The method of encoding the point cloud into the bitstream of encoded point cloud data representing the physical object of claim 1, wherein the left angle ($\varphi_{left,d}$) is interpolated by adding a first angle ($\varphi_{1,d}$) with a weighted difference of a second angle ($\varphi_{2,d}$) and a third angle ($\varphi_{3,d}$), and the right angle ($\varphi_{right,d}$) is interpolated by adding a fourth angle ($\varphi_{4,d}$) with a weighted difference of a fifth angle ($\varphi_{5,d}$) and a sixth angle ($\varphi_{6,d}$).

3. The method of encoding the point cloud into the bitstream of encoded point cloud data representing the physical object of claim 2, wherein the first, second, third, fourth, fifth and sixth angles are inherited angles associated with the parent interval.

4. The method of encoding the point cloud into the bitstream of encoded point cloud data representing the physical object of claim 3, wherein the first, third and sixth angles all equal to a same inherited angle ($\varphi_{1,d-1}$) associated with the parent interval, and the second, fourth and fifth angles all equal to another inherited angle ($\varphi_{middle,d-1}$) associated with a middle point of the parent interval, and, an angle ($\varphi_{middle,d}$) associated with a middle point of either the left or right half interval is computed by performing an arc tangent function.

5. The method of encoding the point cloud into the bitstream of encoded point cloud data representing the physical object of claim 3, wherein the first, third and fifth angles all equal to a same inherited angle ($\varphi_{1,d-1}$), and the second, fourth and sixth angles all equal to another inherited angle ($\varphi_{top,d-1}$) equals to an upper bound of the parent interval, and, either an angle ($\varphi_{top,d}$) associated with an upper bound of the left half interval or an angle ($\varphi_{low,d}$) associated with a lower bound of the right half interval is computed by performing an arc tangent function.

6. The method of encoding the point cloud into the bitstream of encoded point cloud data representing the physical object of claim 5, wherein the angle ($\varphi_{top,d}$) associated with the upper bound of the left half interval or the angle ($\varphi_{low,d}$) associated with the lower bound of the right half interval equals to an inherited angle ($\varphi_{middle,d-1}$) associated with a middle point of the parent interval.

7. The method of encoding the point cloud into the bitstream of encoded point cloud data representing the physical object of claim 6, wherein the inherited angle ($\varphi_{middle,d-1}$) associated with the middle point of the parent interval is interpolating from two inherited angles ($\varphi_{1,d-1}$) and ($\varphi_{top,d-1}$) associated with the parent interval; or wherein the inherited angle ($\varphi_{middle,d-1}$) associated with the middle point of the parent interval is computed by performing an arc tangent function in response to determining that a size of the parent interval is greater than or equal to a determined threshold, or otherwise is interpolated from two inherited angles (($\varphi_{1,d-1}$) and ($\varphi_{top,d-1}$)) associated with the parent interval.

8. The method of encoding the point cloud into the bitstream of encoded point cloud data representing the physical object of claim 5, wherein the angle ($\varphi_{top,d}$) associated with the upper bound of the left half interval or the angle ($\varphi_{low,d}$) associated with the lower bound of the right half interval, for encoding a first bit, are computed by performing arc tangent functions, and the angle ($\varphi_{top,d}$) associated with the upper bound of the left half interval or the angle ($\varphi_{low,d}$) associated with the lower bound of the right half interval, for encoding the following bits, equals to an inherited angle ($\varphi_{middle,d-1}$) associated with a middle point of the parent interval.

9. The method of encoding the point cloud into the bitstream of encoded point cloud data representing the physical object of claim 8, wherein the inherited angle ($\varphi_{middle,d-1}$) associated with the middle point of the parent interval is interpolating from two inherited angles ($\varphi_{1,d-1}$) and ($\varphi_{top,d-1}$) associated with the parent interval; or wherein the inherited angle ($\varphi_{middle,d-1}$) associated with the middle point of the parent interval is computed by performing an arc tangent function in response to determining that a size of the parent interval is greater than or equal to a determined threshold, or otherwise is interpolated from two inherited angles ($\varphi_{1,d-1}$) and ($\varphi_{top,d-1}$)) associated with the parent interval.

10. A non-transitory storage medium carrying instructions of program code for executing the method of encoding the point cloud into the bitstream of encoded point cloud data representing the physical object of claim 1.

11. A method of decoding a point cloud from a bitstream of encoded point cloud data representing a physical object, the method comprising an azimuthal coding mode providing a series of bits for decoding a coordinate of a point of the point cloud, wherein the method comprises:

dividing a parent interval, to which the point coordinate belongs to, into a left half interval and a right half interval;

interpolating a left angle ($\varphi_{left,d}$), associated with the left half interval, and a right angle ($\varphi_{right,d}$), associated with the right half interval, from at least one inherited angle associated with the parent interval;

selecting a context depending on the left angle ($\varphi_{left,d}$) and the right angle ($\varphi_{right,d}$); and context-adaptive binary entropy decoding a bit ($b_d$), from the bitstream, based on the selected context, the decoded bit ($b_d$) indicating which of the two half intervals the point coordinate belongs to.

12. An apparatus of decoding a point cloud from a bitstream of encoded point cloud data representing a physical object, the apparatus comprising one or more processors to implement an azimuthal coding mode providing a series of bits for encoding a coordinate of a point of the point cloud, and the one or more processors are configured to perform the method of claim 11.

13. A non-transitory storage medium carrying instructions of program code for executing the method of decoding the point cloud from the bitstream of encoded point cloud data representing the physical object of claim 11.

14. The method of decoding the point cloud from the bitstream of encoded point cloud data representing the physical object of claim 11, wherein the left angle ($\varphi_{left,d}$) is interpolated by adding a first angle ($\varphi_{1,d}$) with a weighted difference of a second angle ($\varphi_{2,d}$) and a third angle ($\varphi_{3,d}$), and the right angle ($\varphi_{right,d}$) is interpolated by adding a fourth angle ($\varphi_{4,d}$) with a weighted difference of a fifth angle ($\varphi_{5,d}$) and a sixth angle ($\varphi_{6,d}$).

15. The method of decoding the point cloud from the bitstream of encoded point cloud data representing the physical object of claim 14, wherein the first, second, third, fourth, fifth and sixth angles are inherited angles associated with the parent interval.

16. The method of decoding the point cloud from the bitstream of encoded point cloud data representing the physical object of claim 15, wherein the first, third and sixth angles all equal to a same inherited angle ($\varphi_{1,d-1}$) associated with the parent interval, and the second, fourth and fifth angles all equal to another inherited angle ($\varphi_{middle,d-1}$) associated with a middle point of the parent interval, and, an angle ($\varphi_{middle,d}$) associated with a middle point of either the left or right half interval is computed by performing an arc tangent function.

17. The method of decoding the point cloud from the bitstream of encoded point cloud data representing the physical object of claim 15, wherein the first, third and fifth angles all equal to a same inherited angle ($\varphi_{1,d-1}$), and the second, fourth and sixth angles all equal to another inherited angle ($\varphi_{top,d-1}$) equals to an upper bound of the parent interval, and, either an angle ($\varphi_{top,d}$) associated with an upper bound of the left half interval or an angle ($\varphi_{low,d}$) associated with a lower bound of the right half interval is computed by performing an arc tangent function.

18. The method of decoding the point cloud from the bitstream of encoded point cloud data representing the physical object of claim 17, wherein the angle ($\varphi_{top,d}$) associated with the upper bound of the left half interval or the angle ($\varphi_{low,d}$) associated with the lower bound of the right half interval equals to an inherited angle ($\varphi_{middle,d-1}$) associated with the middle point of the parent interval.

19. The method of decoding the point cloud from the bitstream of encoded point cloud data representing the physical object of claim 17, wherein the angle ($\varphi_{top,d}$) associated with the upper bound of the left half interval or the angle ($\varphi_{low,d}$) associated with the lower bound of the right half interval, for decoding a first bit, are computed by performing arc tangent functions, and the angle ($\varphi_{top,d}$) associated with the upper bound of the left half interval or the angle ($\varphi_{low,d}$) associated with the lower bound of the right half interval, for decoding the following bits, equals to an inherited angle ($\varphi_{middle,d-1}$) associated with the middle point of the parent interval.

20. An apparatus of encoding a point cloud into a bitstream of encoded point cloud data representing a physical object, the apparatus comprising one or more processors to implement an azimuthal coding mode providing a series of bits for encoding a coordinate of a point of the point cloud, and the one or more processors are configured to perform:

dividing a parent interval, to which the point coordinate belongs to, into a left half interval and a right half interval;

interpolating a left angle ($\varphi_{left,d}$), associated with the left half interval, and a right angle ($\varphi_{right,d}$), associated with the right half interval, from at least one inherited angle associated with the parent interval;

selecting a context depending on the left angle ($\varphi_{left,d}$) and the right angle ($\varphi_{right,d}$); and context-adaptive binary entropy encoding a bit ($b_d$), into the bitstream, based on the selected context, the encoded bit ($b_d$) indicating which of the two half intervals the point coordinate belongs to.

* * * * *